(12) United States Patent
Nanivadekar

(10) Patent No.: US 10,303,562 B2
(45) Date of Patent: May 28, 2019

(54) USING METADATA EXTRACTED FROM PROXY FILES TO ACCESS DATA STORED IN SECONDARY STORAGE

(71) Applicant: HEWLETT PACKARD ENTERPRISE DEVELOPMENT LP, Houston, TX (US)

(72) Inventor: Mandar Nanivadekar, Bangalore (IN)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 197 days.

(21) Appl. No.: 15/638,040

(22) Filed: Jun. 29, 2017

(65) Prior Publication Data

US 2018/0285212 A1    Oct. 4, 2018

(30) Foreign Application Priority Data

Mar. 30, 2017    (IN) .............................. 201741011475

(51) Int. Cl.
*G06F 3/06* (2006.01)
*G06F 11/14* (2006.01)
*G06F 16/11* (2019.01)
*G06F 16/16* (2019.01)
*G06F 16/188* (2019.01)

(52) U.S. Cl.
CPC ........ *G06F 11/1469* (2013.01); *G06F 3/0647* (2013.01); *G06F 11/1451* (2013.01); *G06F 11/1464* (2013.01); *G06F 16/128* (2019.01); *G06F 16/16* (2019.01); *G06F 16/188* (2019.01)

(58) Field of Classification Search
CPC ............. G06F 11/1469; G06F 11/1451; G06F 11/1464; G06F 16/188; G06F 16/16; G06F 16/128; G06F 3/0647; H04L 63/0281
See application file for complete search history.

(56) References Cited

U.S. PATENT DOCUMENTS

| | | | |
|---|---|---|---|
| 8,719,286 B1 * | 5/2014 | Xing | G06F 11/1451 707/755 |
| 8,996,809 B2 | 3/2015 | Quan | |
| 9,424,061 B2 | 8/2016 | Freimuth et al. | |
| 9,495,404 B2 | 11/2016 | Kumarasamy et al. | |
| 10,114,581 B1 * | 10/2018 | Natanzon | G06F 3/065 |
| 10,146,629 B1 * | 12/2018 | Yadav | G06F 11/1451 |

(Continued)

OTHER PUBLICATIONS

Jo, C. et al., "Efficient Live Migration of Virtual Machines Using Shared Storage", Mar. 16-17, 2013, Houston, Texas, pp. 41-50. http://citeseerx.ist.psu.edu/viewdoc/download?doi=10.1.1.725.4222&rep=rep1&type=pdf.

*Primary Examiner* — Paul Contino

(57) ABSTRACT

A technique includes creating a proxy file that is associated with a recovery request, which is associated with the recovery of data associated with a virtual machine file from a secondary storage. The technique includes using metadata that is extracted from the proxy file to access the data. Using the metadata includes, in response to an input/output (I/O) request associated with the recovery request, storing an association of an identifier of the proxy file with metadata representing a parameter associated with the secondary storage. The metadata is stored outside the proxy file. The metadata is used to identify an I/O processing unit; and the technique includes communicating with the I/O processing unit to notify the I/O processing unit to process the I/O request.

20 Claims, 11 Drawing Sheets

(56) References Cited

U.S. PATENT DOCUMENTS

| | | | |
|---|---|---|---|
| 2005/0193235 A1* | 9/2005 | Sandorfi | G06F 11/1448 714/6.12 |
| 2007/0061385 A1* | 3/2007 | Clark | G06F 11/1448 |
| 2007/0185934 A1* | 8/2007 | Cannon | G06F 11/1469 |
| 2008/0034364 A1* | 2/2008 | Lam | G06F 8/63 718/1 |
| 2010/0070725 A1* | 3/2010 | Prahlad | G06F 11/1453 711/162 |
| 2010/0106907 A1* | 4/2010 | Noguchi | G06F 11/2069 711/114 |
| 2012/0117031 A1* | 5/2012 | Cha | G06F 11/00 707/674 |
| 2014/0059375 A1* | 2/2014 | McElhoe | G06F 11/1484 714/4.1 |
| 2014/0074790 A1* | 3/2014 | Berman | G06F 11/1448 707/649 |
| 2014/0095816 A1* | 4/2014 | Hsu | G06F 3/0655 711/162 |
| 2014/0149696 A1* | 5/2014 | Frenkel | G06F 12/16 711/162 |
| 2016/0004605 A1* | 1/2016 | Ahn | G06F 16/00 707/679 |
| 2016/0085636 A1 | 3/2016 | Dornemann et al. | |
| 2017/0083540 A1* | 3/2017 | Mamluk | G06F 11/1471 |
| 2017/0116088 A1* | 4/2017 | Anami | G06F 9/455 |
| 2018/0032409 A1* | 2/2018 | Surakanti | G06F 11/1469 |
| 2018/0150365 A1* | 5/2018 | Cors | G06F 11/203 |
| 2018/0253361 A1* | 9/2018 | Dhatrak | G06F 11/1469 |
| 2018/0285202 A1* | 10/2018 | Bhagi | G06F 11/1464 |

* cited by examiner

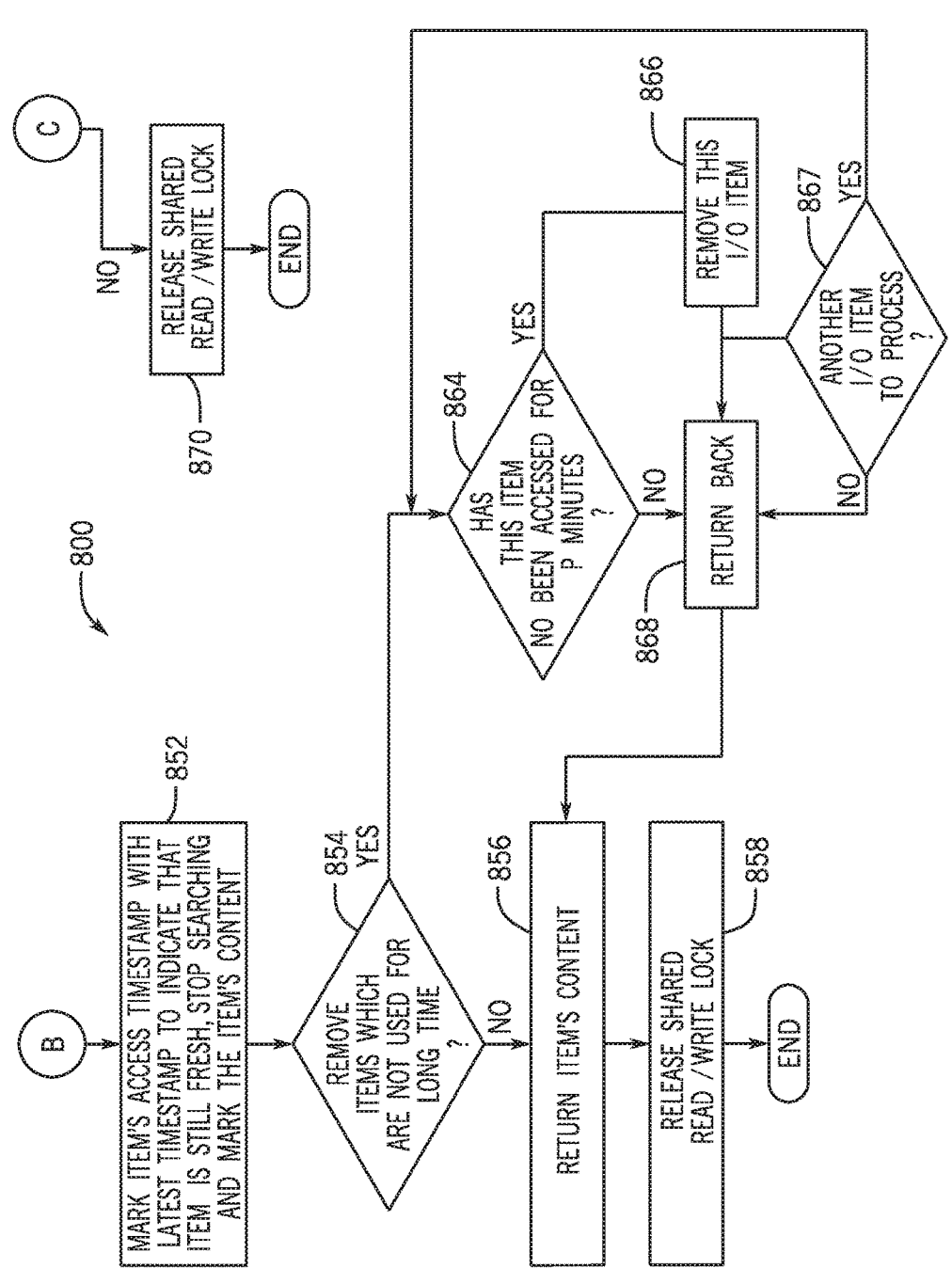

USING METADATA EXTRACTED FROM PROXY FILES TO ACCESS DATA STORED IN SECONDARY STORAGE

PRIORITY

The present application claims priority under 35 U.S.C. 119(a)-(d) to Indian application number 201741011475, having a filing date of Mar. 30, 2017, the disclosure of which is hereby incorporated by reference in its entirety.

BACKGROUND

A computer network may have a backup and recovery system for purposes of restoring data (data contained in one or multiple files, for example) of the network to a prior state should the data become corrupted, be overwritten, be subject to a viral attack, and so forth. The backup and recovery system may store backup data in a non-volatile secondary storage, which may be formed from one or multiple direct attached hard drives; one multiple virtual or physical tape drives; a storage appliance; a storage area network (SAN); and so forth.

The backup data may represent virtual machine files. In this manner, the virtual machine files may be files representing virtual disks, configurations, logs, states, and so forth for virtual machines of the computer network. A "virtual machine" generally refers to some an arrangement of components (software and/or hardware) for virtualizing or emulating an actual computer, where the virtual machine can include an operating system and software applications. Virtual machines can allow different operating systems to be deployed on the same physical computing platform, such that applications written for different operating systems can be executed in different virtual machines (that contain corresponding operating systems) on the platform. Moreover, the operating system of a virtual machine can be different from the host operating system that may be running on the platform on which the virtual machine is deployed.

BRIEF DESCRIPTION OF THE DRAWINGS

FIGS. 8A, 8B and 8C depict a flow diagram illustrating a technique to process I/O requests associated with a recovery request according to an example implementation.

DETAILED DESCRIPTION

Figure 1:
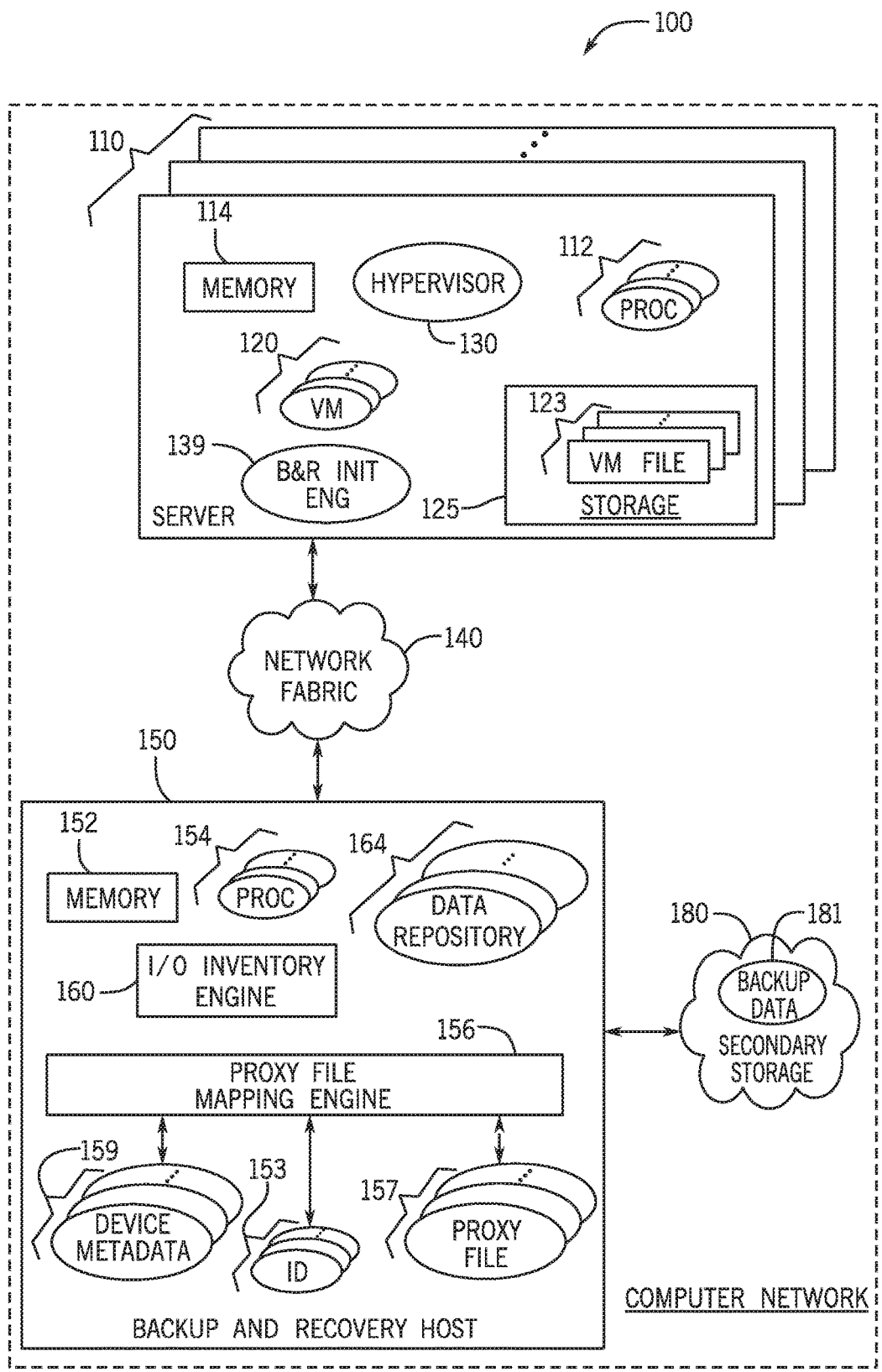
FIG. 1 is a schematic diagram of a computer network that includes a backup and recovery system to backup and restore virtual machine files according to an example implementation.

In accordance with example implementations, a computer network may include a backup and recovery system for such purposes as storing backup data for virtual machine files and recovering the backup data to restore the virtual machine files to specified states. The virtual machine files, in general, are associated with virtual machines and may be associated with virtual machine configurations, virtual machine logs, virtual machine states, virtual machine disks, applications executed by virtual machines, and so forth. As examples, the virtual machine files may be files containing the filename extensions .vmdk, .vhdx, .ctk, .cbt files, and so forth. The backup data for a given virtual machine may include data representing a specific file for a specific virtual machine, as well as data representing one or multiple other shared, or common, files that are shared by the specific virtual machine with one or multiple other virtual machines.

The backup and recovery system may include a host and a secondary storage. The host, in general, may receive backup requests to perform backups of virtual machine files by storing backup data representing full, incremental and/or differential backups of virtual machine files in the secondary storage; and the host may receive recovery requests to restore selected virtual machine files to predetermined versions, or states, based on these backups. In general, "secondary storage" refers to a non-volatile storage other than the main, or primary memory, of a computer. Thus, a secondary storage may store duplicate or backup virtual machine files (e.g., in compressed or alternative formats) in addition to virtual machine files maintained in the main memory of a computer or system. As examples, the secondary storage may include mass storage devices, such as magnetic or optical disk drives; physical or virtual tape drives; storage appliances; storage area networks (SANs); and so forth.

In accordance with example implementations, the host may communicate with the virtual machines via a virtual machine monitor, or hypervisor, for the virtual machines. In general, the hypervisor manages the sharing of the physical resources of a physical computing platform on which virtual machines are located.

The virtual machine files may be accessed and viewed by the hypervisor and other entities using a directory-based file system. However, the data stored in the secondary storage may be accessed and organized differently. For example, the secondary storage may be associated with a storage appliance and store data corresponding to a virtual machine file in respective object streams in the secondary storage. In this manner, an "object stream" refers to a collection of blocks, and each block of the stream may have an associated offset.

As an example, a virtual machine may have N multiple virtual machine disks. The data for the virtual machine disks may be stored in the secondary storage as N+1 object streams: one object stream contains the data for the associated virtual machine common files; and each virtual machine disk file may be stored as part of a separate object stream. Moreover, a single object stream may contain interleaved blocks of data for corresponding multiple virtual disks/virtual machine files. Multiple object streams may be part of a data unit called "an object store." The data for a particular virtual machine file (i.e., the location of the data in the secondary storage) may thus be referenced by such parameters as an object store identifier, a physical offset and a size, in accordance with example implementations.

It is noted that the data stored in the secondary storage may be stored and accessed using different parameters than those described above.

A customer may, through backup and recovery software, initiate the recovery of backed up virtual machine file data for different purposes. For example, the customer may restore a virtual machine or application that is executed by a virtual machine, which has been corrupted. As another example, a customer may restore a virtual machine or application when setting up a new virtual machine or application. As another example, a customer may use a "granular recovery" to restore particular files or directories instead of a complete recovery of data for legal compliance reasons or for purposes of restoring specific corrupted files or directories. A virtual machine may also be powered on directly from backup instead of restoring for backup validation. Moreover, virtual machine file data for a virtual machine may be recovered from secondary storage while the virtual machine is still powered on.

In the case of granular recovery for a virtual machine in which specific files or directories are being restored instead of the complete virtual machine, the user may browse and select files or directories (i.e., a collection of files) from a particular virtual disk or disks that are used by the virtual machine. For this purpose, a given virtual disk may be mounted using virtual vendor application programming interfaces (APIs) so that once mounted, the virtual disk may be browsed so that the files and/or directories may be selected for recovery. In accordance with example implementations, the process of selecting the files and/or directories triggers a recovery request, which begins a recovery session to restore the files and/or directories to a predetermined state.

The same set of virtual machine files may be accessed in connection with multiple parallel recovery sessions. Here, "parallel" sessions refer to sessions that overlap (at least partially) each other in time. As an example of parallel recovery sessions, a user may initiate a granular recovery session for a particular virtual machine, and the user may also select a recovery session to power on the same virtual machine while the granular recovery session is underway.

In accordance with example implementations that are described herein, device metadata is used to represent one or multiple secondary storage parameters for purposes of accessing backup data (stored in secondary storage) that is associated with a particular virtual machine file and recovery. As described further herein, a backup and recovery host associates the device metadata with a unique identifier to allow the host to efficiently access the device metadata, and this efficient access allows the host to quickly determine or identify the secondary storage parameters, which may thereby decrease the time for recovering backup data from the secondary storage, especially when parallel recovery sessions involve recovering data for the same virtual machine files.

In accordance with example implementations, the secondary storage parameters (represented by the device metadata) describe how to access the data in the secondary storage and may include one or multiple of the following. The secondary storage parameters may represent a storage path, or location, for the backup data for an associated virtual machine file. For example, the storage parameters may represent one or multiple of the following: an object store, an object stream, a data block offset, a data length, a storage device identification, and so forth. The secondary storage parameters may represent credentials that are associated with the host and which are used by the host to access secondary storage devices. For example, the secondary storage parameters may represent an Internet Protocol (IP) address of the host and a password of the host. As another example, secondary storage parameters may represent an initiator identifier (a Fibre Channel or small computer system Interface (SCSI) identifier, for example); and the secondary storage parameters may include a password that is associated with this identifier.

The parallel processing of multiple recovery requests by the backup and recovery host may result in the same storage device (a tape drive, disk drive, and so forth) of the secondary storage processing a relatively large number of input/output (I/O) requests. The storage device may have a relative slow access time (a seek time, for example), which may introduce a bottleneck in the recovery of backup data from the secondary storage.

Parallel operations involving the same storage device may be the result of the same virtual machine file being accessed due to parallel recovery sessions, as noted above. However, the parallel operations may also be the result of the same storage device being accessed for parallel recovery sessions. For example, a customer in a data center may initiate an incremental granular recovery session, which may result in accessing multiple backup object streams that were backed up in different backup sessions at different intervals in time. At or about the same time, the customer or other user in the same data center may initiate granular recovery of another virtual machine or perform a power on of a different virtual machine. The data for these different parallel recovery sessions may be stored in the same backup storage device of the secondary storage. For example, a given virtual machine may have a single virtual disk but due to partitioning, the virtual machine may have multiple volumes like C:, E: and F:. During the power on of a virtual machine, all of these volumes across the multiple partitions may be accessed, which results in I/O requests to the same storage device.

In accordance with example implementations, a host of a backup and recovery system reduces the number of I/O requests to a secondary storage by retrieving larger blocks of data from secondary storage than requested for some I/O requests and using the retrieved data to fulfill other I/O requests. More specifically, in accordance with example implementations, the host creates a logical processing unit (also called an "I/O processing unit," "logical I/O processing unit" herein) to process the I/O requests for each recovery request/session. The logical I/O processing unit may have an associated data repository, such that the logical processing unit, in response to a given I/O request directed to retrieving a unit of data from the secondary storage, submits a modified I/O request to the secondary storage to retrieve a larger block of data. The logical I/O processing unit may store the larger block of data in the data repository and may repeat this process to store a collection of blocks of data in the data repository from which I/O requests may be served without accessing the secondary storage (i.e., a particular incoming I/O request may target data already in the repository). Moreover, as described herein, the logical I/O processing unit may perform management of its data repository to remove blocks that are not frequency accessed, consolidate blocks, and so forth.

In accordance with example implementations, the "logical processing unit" refers to an entity, or component, which performs one or multiple actions. The logical processing unit may be software-based, hardware-based, or may be formed from a combination of hardware and software, depending on the particular implementation. For example, in accordance with some implementations, a logical processing unit may be formed from a hardware processor (a central processing unit (CPU), one or multiple CPU cores, and so forth) executing machine executable instructions ("software") to form a corresponding function, thread, or process to perform the actions for the logical processing unit. In accordance with example implementations, the logical processing unit may be formed from a dedicated hardware circuit, such as an Application Specific Integrated Circuit (ASIC), Field Programmable Gate Array (FPGA), and so forth.

FIG. 1 depicts a computer network 100 in accordance with example implementations. Referring to FIG. 1, the computer network 100 includes one or multiple servers 110, and each server 110 may include a hypervisor 130, which manages the sharing of the physical resources of the server 110 by one or multiple virtual machines 120. In this manner, in accordance with example implementations, the server 110 is an actual, physical machine that may include such physical resources as a memory 114; one or multiple processors 112 (one or multiple central processing units (CPUs)), one or multiple CPU processing cores, and so forth; and a non-volatile storage 125. The memory 114 may, for example, store data and may store instructions, which are executed by the processor(s) 112 for purposes of providing the virtual machines 120 and hypervisor 130. The non-volatile storage 125 is a non-transitory storage medium and may be formed from one or multiple storage devices, such as semiconducting storage devices, magnetic storage devices, phase change memory devices, optical devices, memristors, or a combination of all of the storage technologies. The server 110 may have many other physical resources that are shared by the virtual machines 120, such as a network interface, a display I/O device, a storage area network (SAN) interface, and so forth.

In general, a virtual machine 120 refers to some partition or segment (made of software and/or hardware) of the server 110, which is provided to virtualize or emulate a physical machine. From the perspective of a user, a virtual machine 120 has the same appearance as a physical machine. As an example, a particular virtual machine 120 may include one or more software applications, and an operating system and one or more device drivers (which are typically part of the operating system). The operating systems that are part of the corresponding virtual machines 120 within a particular physical machine, such as the server 110, may be different types of operating systems or different versions of an operating system. This allows software applications designed for different operating systems to execute on the same physical platform.

The hypervisor 130, in accordance with example implementations, manages the sharing of the hardware resources of the server 110 by the virtual machines 120, and in general, the hypervisor 130 virtualizes the physical resources of the server 110. Also, the hypervisor 130 may, in accordance with example implementations, intercept requests for resources from operating systems in the respective virtual machines 120 so that proper allocation of the physical resources of the server 110 may be performed. As examples, the hypervisor 130 may manage memory accesses, I/O device accesses and CPU scheduling for the virtual machines 120. Effectively, the hypervisor 130 provides an interface between the operating system of each virtual machine 120 and the underlying hardware of the server 110. The interface provided by the hypervisor 130 to an operating system of a virtual machine 120, in accordance with example implementations, is constructed to emulate the interface that is provided by the actual hardware of the server 110.

In accordance with example implementations that are described herein, the computer network 100 includes secondary storage 180 that stores backup data 181 for virtual machine files 123 of the virtual machines 120. The hypervisor 130 may use a file system to view and access data for the virtual machine files 123 in the storage 125. However, this file system may be different than the scheme/system that is used to store/read the backup data 181 in/from the secondary storage 180. For example, in accordance with example implementations, the hypervisor 130 may use a Network File System (NFS) or a Common Internet File System (CIFS) to access the virtual machine file data in the storage 125, whereas the backup data 181 that is stored in the secondary storage may be stored by a scheme other than the NFS/CIFS file system. For example, the backup data 181 may be stored and retrieved according to a scheme that stores blocks of the data sequentially and references the blocks by object stores, object streams and offsets; according to a scheme that stores the data in a non-sequential manner as blocks, where each block is chunked into smaller blocks, whose locations are identified by metadata of the larger parent block; and so forth.

In the example shown in FIG. 1, the secondary storage 180 is part of a backup and recovery system for the computer network 100. The secondary storage 180 is a storage other than the primary memory 114 of the server 110 and may contain one or multiple physical mass storage devices, such as magnetic drives, optical drives, storage appliances, tape drives, and so forth. Depending on the particular implementation, the storage devices of the secondary storage may be direct attach devices or may be coupled to the servers 110 via the network fabric 140 or other communication fabric. A examples, the network fabric 140 may include components and use protocols that are associated with any type of communication network, such as (for example) Fibre Channel networks, iSCSI networks, ATA over Ethernet (AoE) networks, HyperSCSI networks, local area networks (LANs), wide area networks (WANs), global networks (e.g., the Internet), or any combination thereof.

In accordance with example implementations, the backup and recovery system includes a backup and recovery host 150 (herein called "the host 150"). In accordance with example implementations, a backup and recovery engine 139 of the server 110 may initiate, under the direction of a user, backup and recovery sessions via associated backup and recovery requests, respectively. In this manner, the backup and recovery engine 139 may allow a user to browse virtual machine disks, including directories within the disks and user files within these directories. The backup and recovery engine 139 may also allow the user to select one or more of these files for one or more backup and/or recovery sessions; and the backup and recovery engine 139 correspondingly submits associated backup and recovery requests.

The hypervisor 130 may respond to a given backup or recovery request submitted by the backup and recovery engine 139 by communicating with the host 150. In this manner, the host 150 may communicate with the host 150 for purposes of storing backup data in the secondary storage 180 to backup virtual machine files 123 and retrieving backup data from the secondary storage 180 to restore virtual machine files 123 to specified states. Depending on the particular implementation, the host 150 may be an actual, physical machine that is made up of actual software and hardware; or, in accordance with further example implementations, the host 150 may be a virtual machine that is formed by machine executable instructions, or software, executing on a physical machine, a server 110 or multiple servers 110 or another physical machine. As depicted in the example implementation that is depicted in FIG. 1, the hypervisor 130 may communicate with the host 150 over the network fabric 140.

In accordance with example implementations, the host 150 is a physical machine that includes a memory 152 and one or multiple processors 154. In this manner, the processor 154 may be, as an example, a CPU, one or multiple CPU cores, and so forth. Moreover, the memory 152 may be a non-transitory memory that may be formed from, as examples, semiconductor storage devices, phase change storage devices, magnetic storage devices, memristor-based devices, a combination of storage devices associated with multiple storage technologies, and so forth.

In accordance with further example implementations, the host 150, hypervisor 130 and/or virtual machines 120 may be part of the same server 110.

In general, a given recovery session, in accordance with example implementations, restores a virtual machine file 123 to a state that is associated with a particular incremental, differential, or full backup session. The recovery session may be, as examples, a session to restore one or multiple virtual machine files as a remedial action in the case of corruption or a request involving the setup of a new virtual machine 120; a session to restore particular virtual machine files and/or directories (user's files or a virtual machine disk, for example); a granular recovery session; a session directed to powering on a virtual machine 120 directly from the secondary storage 180; a session for purposes of recovering virtual machine data for a virtual machine while the virtual machine is in a powered on state; and so forth. Regardless of its purpose, in accordance with example implementations, a given recovery session is associated with at least one virtual machine file and an associated recovery request. Moreover, the virtual machine file may be a virtual disk file; a configuration file; a log; a file associated with an application being executed by a virtual machine; and so forth.

Because the data access schemes that are used by the hypervisor 130 and the secondary storage 180 may differ, in accordance with example implementations, the host 150 may create a proxy file 157 for each recovery session. In this manner, in response to a recovery request to initiate a corresponding recovery session to restore a particular virtual machine file 123 to a given state, the host 150 creates a corresponding proxy file 157 for the virtual machine file 123; and the hypervisor 130 may then access the proxy file 157 to submit I/O requests to store/retrieve backup data 181 for the file in the secondary storage 180 in this recovery session. Although recovery requests and recovery sessions are specifically discussed herein, it is noted that the proxy files 157 may be used for backup operations associated with backup sessions, in accordance with example implementations.

More specifically, in accordance with example implementations, the hypervisor 130 specifies a file format for virtual machine files. The virtual machine files may be contained in, for example, a CIFS or CIFS share, so that the hypervisor 130 understands the CIFS/NFS share format and accesses the virtual machine files via the CIFS/NFS share. In accordance with some implementations, the proxy file 157 may be a "thin file," which occupies no local storage. In this manner, a thin file refers to a file which has associated metadata that represents data that appears to exist in local storage (in local storage on the server 110, CIFS or CIFS share, for example), but this data does not actually exist in the local storage. In accordance with example implementations, the proxy file 157 may be a thin file in which the contents of the proxy file are simulated on the fly using various software and/or hardware systems. It is noted that for some recovery sessions, the proxy file 157 may not be placed in the CIFS/NFS share. For example, for a granular recovery session, the proxy file 157 may be directly accessed using APIs of the hypervisor 130. Regardless of the particular mechanism used, the hypervisor 130 may, in accordance with example implementations, perceive the proxy files 157 as being virtual machine files 123, and accordingly, the hypervisor 130 may submit I/O requests to read data from the proxy files 157 for a given recovery session.

Figure 2:
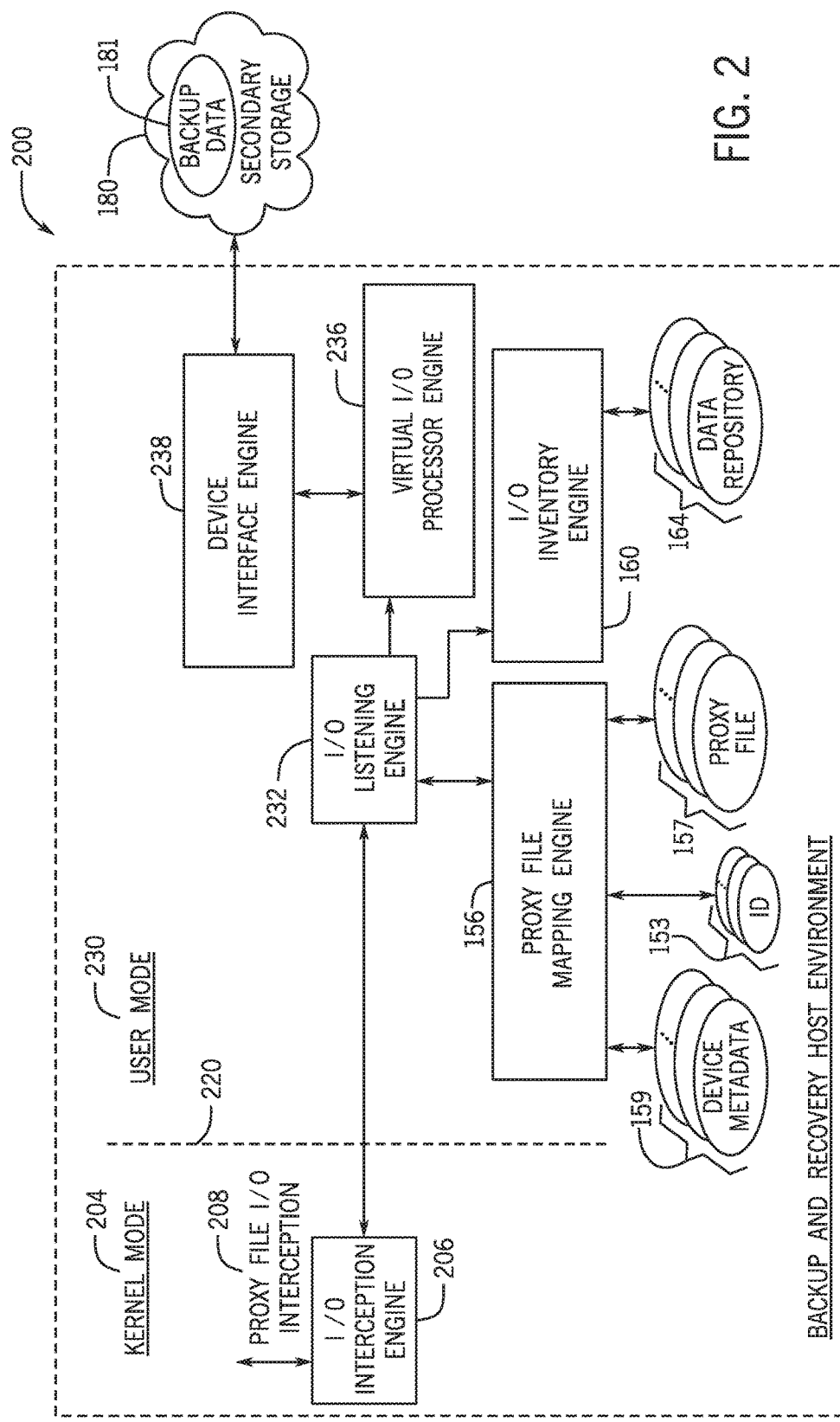
FIG. 2 is an illustration of an environment of a host of the backup and recovery system according to an example implementation.

More specifically, referring to FIG. 2 (depicting a backup host environment 200) in conjunction with FIG. 1, in accordance with example implementations, when the hypervisor 130 attempts to read data from a proxy file 157, a call back is generated, which is intercepted by an I/O interception engine 206 of the host 150 (the interception as depicted at reference numeral 208); and the I/O interception engine 206 then contacts a background, or daemon, I/O listening engine 232 of the host 150. As described further herein, the I/O listening engine 232 initiates a process to cause a device interface engine 238 of the host 150 to retrieve the corresponding data from the secondary storage 180. In this manner, the device interface engine 238 may handle the specific physical layer for communicating with the storage devices of the secondary storage 180.

One approach to using the proxy files 157 is for the I/O interception engine 206 to parse the proxy file 157 for every callback. In this manner, the proxy file 157 contains device metadata, which represents one or multiple secondary storage parameters, which are described above. However, parsing the proxy file 157 may be a time consuming process. In this manner, the proxy file 157 may contain many other fields of data, other than the device metadata, such as metadata representing the identifier for the associated virtual machine file; metadata representing a read only flag; metadata representing identifying whether the proxy file may be overwritten; metadata representing a delete flag indicating whether the proxy file may be deleted; metadata representing version information for the proxy file; and metadata representing the name of the proxy file.

In accordance with example implementations, the host 150 includes a proxy file mapping engine 156, which generates a unique identifier 153 when an associated proxy file 157 is created; and the identifier 153, in turn, identifies device metadata 159, which describes one or multiple secondary storage parameters for referring the corresponding data from the secondary storage 180.

In this manner, in accordance with example implementations, when a given proxy file 157 is accessed for the first time, the host 150 reads and parses all of the metadata of the proxy file 157, and as a part of this reading and parsing, the proxy file mapping engine 156 extracts the device metadata 159. When the host subsequently accesses the same proxy file 157 again, in accordance with example implementations, the proxy file mapping engine 156 uses the identifier 153 associated with the proxy file 157 to retrieve the device metadata 159, which now exists outside of the proxy file 157; and as such, the proxy file mapping engine 156 may retrieve the device metadata 159 without once again parsing the proxy file 157. In accordance with example implementations, the proxy file mapping engine 156 may maintain an association (an entry in a table, for example), which maps the identifier 153 to the device metadata 159. Because the proxy file mapping engine 156 need not parse the proxy file 157 after the initial access and parsing of the proxy file 157, the time otherwise consumed by the host 150 processing I/O requests may be reduced.

As described herein, the proxy file mapping engine 156 may process recovery requests to create the proxy files 157, extract device metadata 159 from the proxy files 157, and use the extracted device metadata to identify logical processing units, which may handle the processing of I/O requests for the corresponding recovery sessions, as further described herein.

In accordance with example implementations, the device metadata included in proxy files contains a complete eXtensible Language Markup (XML) file path, such as, for example, the following path: c:\programdata\ominback\tmp\PowerON\<identifier 153>\meta.xml.

Figure 3:
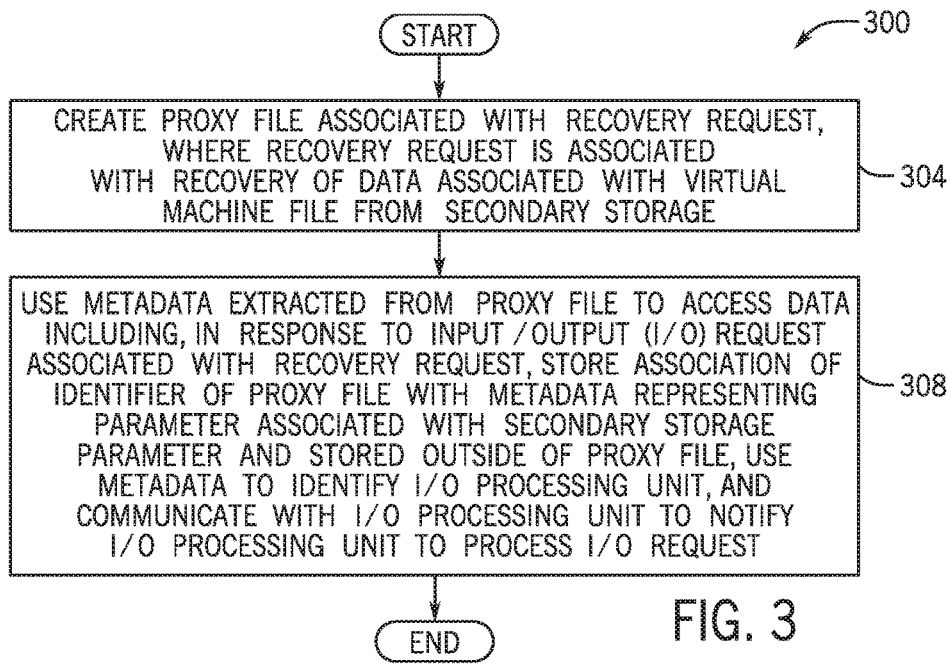
FIGS. 3 and 4 are flow diagrams depicting techniques to use device metadata extracted from proxy files to access backup data stored in a secondary storage according to example implementations.

Referring to FIG. 3, in accordance with example implementations, a technique 300 includes creating (block 304) a proxy file that is associated with a recovery request, where the recovery request is associated with the recovery of data associated with a virtual machine file from secondary storage. The technique 300 includes, using (block 308) metadata extracted from a proxy file to access data, including in response to the hypervisor initiating an input/output (I/O) operation associated with the recovery request, store an association of an identifier of the proxy file with metadata, where the metadata represents a path to the data in the secondary storage and is stored outside of the proxy file. The metadata may be used to identify an I/O logical processing unit, and the technique 300 includes communicating with the I/O logical processing unit to notify the I/O logical processing unit to process the I/O request.

Figure 4:
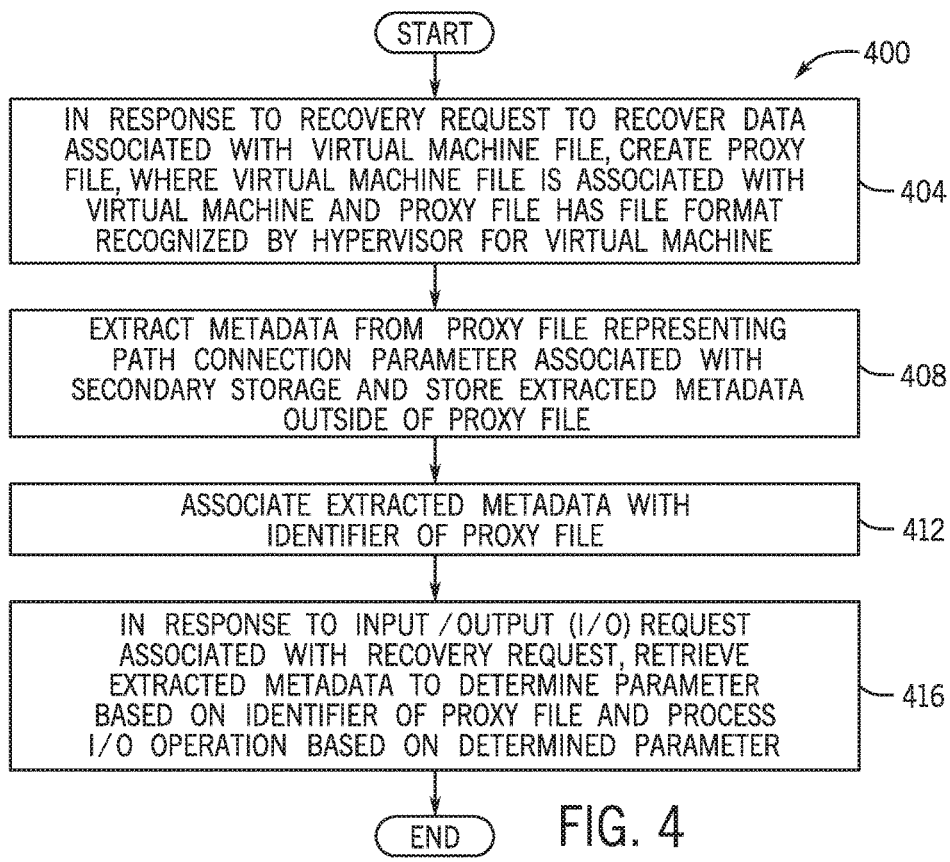

More specifically, referring to FIG. 4, in accordance with example implementations, a technique 400 includes, pursuant to block 404, in response to a recovery request to recover data associated with a virtual machine file, create a proxy file. The virtual machine file is associated with a virtual machine and the proxy file has a file format that is recognized by a hypervisor. The technique 400 includes extracting (block 408) metadata from the proxy file, which represents a parameter that is associated with the secondary storage and storing the extracted metadata outside of the proxy file. The technique 400 includes associating (block 412) the extracted metadata with an identifier of the proxy file. The technique 400 further includes, pursuant to block 416, in response to an input/output (I/O) request that is associated with recovery request, retrieving the extracted metadata to determine the parameter and processing the I/O request based on the determined parameter.

Referring back to FIG. 2, in accordance with example implementations, the host 150 may include an I/O inventory engine 160, which reduces the number of I/O calls otherwise made to the storage devices of the secondary storage 180. More specifically, in accordance with example implementations, the I/O inventory engine 160 may be associated with multiple I/O logical processing units. For example, in accordance with example implementations, the host 150 may create multiple logical processing unit instances of the I/O inventory engine 160 (I/O logical processing units) by executing corresponding threads. Each I/O logical processing unit, in turn, has an associated data repository 164. More specifically, in accordance with example implementations, the I/O inventory engine 160, for each new proxy file being accessed for the first time, creates a new I/O logical processing unit, which is responsible for processing all of the subsequent I/O transfers for the proxy file (i.e., processing the I/O request for the associated recovery request for the backup session In accordance with example implementations, each I/O logical processing unit is associated with a specific data repository 164. In accordance with example implementations, when the host 150 receives an I/O read request for data associated with a given proxy file at a specific offset, the host 150 checks the associated I/O logical processing unit to determine if this data (i.e., data referenced by offset and length, for example) is present in the associated data repository 164. If so, then the I/O logical processing unit retrieves the data from the data repository 164, thereby avoiding retrieving the data from the secondary storage 180.

In accordance with example implementations, if the data for the I/O read request is not present in the data repository 164, then the I/O logical processing unit retrieves a block of data from the secondary storage 180. In accordance with example implementations, the read bock of data may be significantly larger than the size requested by the I/O read request. In this regard, the incoming read I/O request may, for example, request a 4 or 8 kB size block of data. However, the I/O logical processing unit may retrieve a relatively larger block of data, such as a 2 MB block of data at the same offset.

In accordance with example implementations, the I/O logical processing unit maintains a timestamp that may be used later to decide whether entries stored in the associated data repository 164 may be released or reused.

The size of the data repository 164 (i.e., the storage capacity allocated for the repository 164) may vary, depending on the particular implementation, between, for example 512 kB to 5 MB, depending on one of many factors. In this regard, the sizes of the data repositories 164 may vary, and the size for a given data repository 164 may depend on such factors as the device supported maximum buffer size, the device type and latency, the device load and the type of operation. For example, for a recovery session associated with a granular recovery or a power on operation, the amount of data being transferred may be less as compared to, for example, a recovery session in which virtual machine files for a virtual machine are being recovered while the virtual machine remains powered on. Hence, a smaller size for the data repository 164 may be selected for retrieving data for granular recovery and power on-related recovery sessions. Conversely, for a recovery session in which, for example, virtual machine files are being recovered for a virtual machine while the virtual machine remains powered on, the data repository 164 may be configured to have a relatively larger size because the data for an entire virtual machine disk may be retrieved from the secondary storage 180.

Thus, in accordance with example implementations, the size of the data repository 164 may be dynamically sized based on a characteristic of the recovery request/recovery session, such as the amount of data being restored, whether the recovery session is restoring an entire virtual machine disk, whether the recovery session is a granular session that restores selected files or directories, and so forth.

In accordance with example implementations, a given data repository 164 may include multiple buffers (where each buffer corresponds to the block size being retrieved from the secondary storage 180), with the number depending on a number of factors. Each buffer of the data repository, in turn, stores an entry, or "item," of data. For example, the data repository 164 may have a total size of 2 MB, which starts at an offset of 100 kB as a first buffer and may store a second buffer of 2 MB, which starts at an offset of 100 MB. After the inventory reaches a limit (50 items, as an example), then, in accordance with example implementations, the I/O logical processing unit may push the last buffer that was created (e.g., empty or overwrite the item) last and add another buffer (e.g., replace the overwritten item with another item).

In general, the number of items that may be stored in the data repository 164 (i.e., the number of buffers) may depend on such factors as the available memory on the host 150, the number of proxy files being accessed at the same time, how frequently the data repository 164 is being accessed, and so forth.

When an I/O request is received, in accordance with example implementations, the I/O logical processing unit checks the inventory of its data repository 164 to determine if data to satisfy the I/O request is stored in the repository 164. If found, in accordance with example implementations, the I/O logical processing unit copies the data from the data repository 164 and sends the data back in response to the I/O request, without submitting a call to the secondary storage 180. This helps in avoiding calls to the secondary storage 180. Moreover, the access also updates the access timestamp for this particular item. In accordance with example implementations, the I/O logical processing unit may merge items that overlap in terms of offsets to create larger items.

Figure 5A:
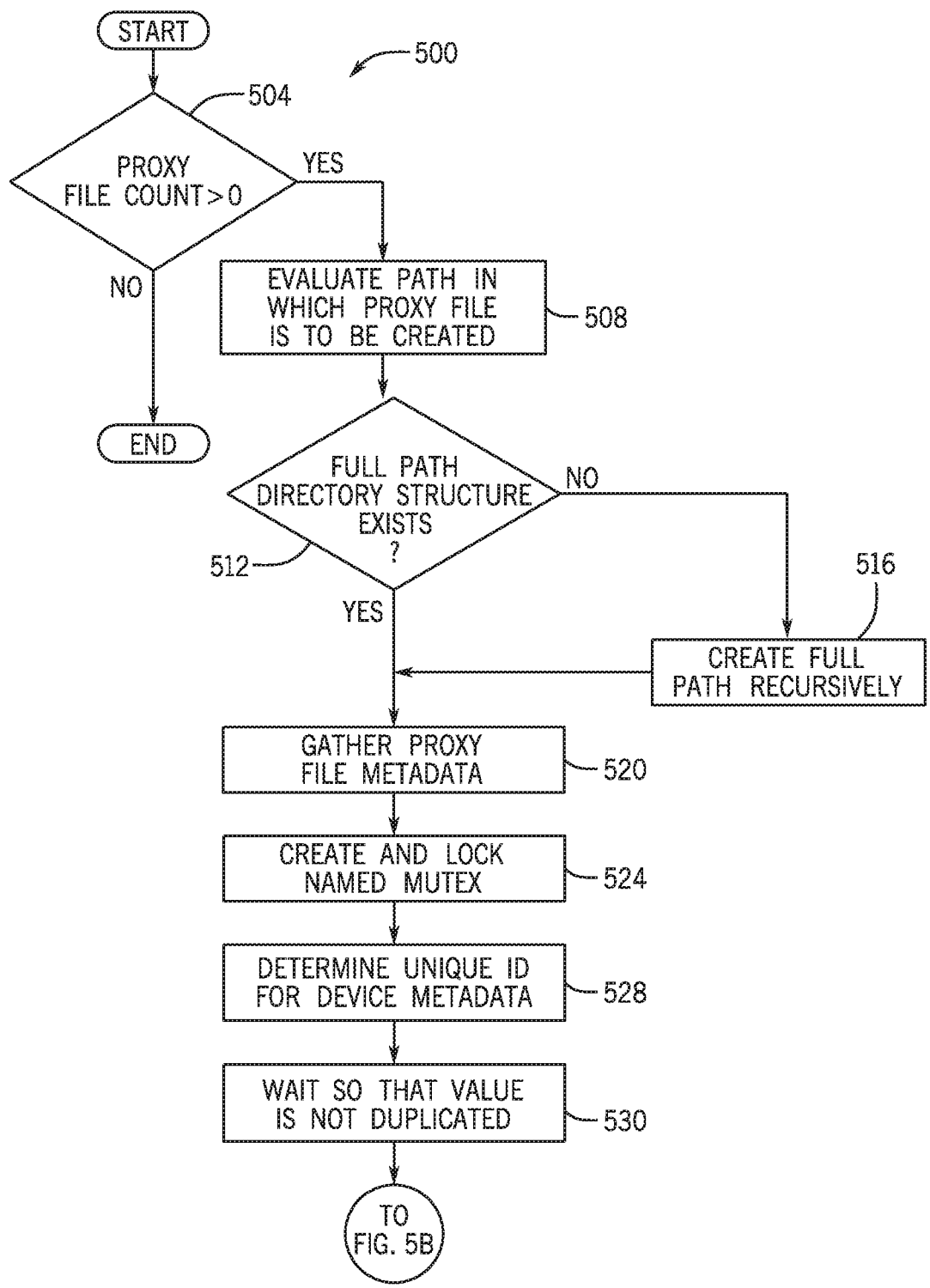
FIGS. 5A and 5B depict a flow diagram illustrating a technique to create a proxy file associated with a recovery request according to an example implementation.

Referring to FIG. 5A in conjunction with FIG. 2, in accordance with example implementations, the proxy file mapping engine 156 may perform a technique 500 for purposes of creating a proxy file in response to an associated recovery request. Pursuant to the technique 500, the proxy file mapping engine 156 determines (block 504) whether a proxy file count is greater than zero, i.e., determines whether another proxy file is to be created. If so, the proxy file mapping engine 156 evaluates (block 508) the path in which the proxy file is to be created. If the proxy file mapping engine 156 determines (decision block 512) that a full path directory does not exist, then the proxy file mapping engine 156 creates the full path recursively, pursuant to block 516.

Next, pursuant to block 520, the proxy file mapping engine 156 gathers the proxy file metadata and creates (block 520) and locks an object for the name (a mutex) of the proxy file. More specifically, in accordance with some implementations, the proxy file name contains a unique identifier and is computed based on an ongoing time. More specifically, in accordance with some implementations, the proxy file mapping engine 156 determines (block 528) a unique identifier for the device metadata. For example, in accordance with some implementations, the unique identifier may be determined based on the number of milliseconds (ms) after, or since, the host 150 was started. For example, in accordance with some implementations the proxy file mapping engine 156 may access a four byte value that represents a host time and may be, for example, unique for 52 days. Pursuant to the technique 500, the proxy file mapping engine 156 may then wait (block 530) so that the unique identifier value is not duplicated. In accordance with example implementations, the proxy file mapping engine 156 may wait for 100 ms.

Figure 5B:
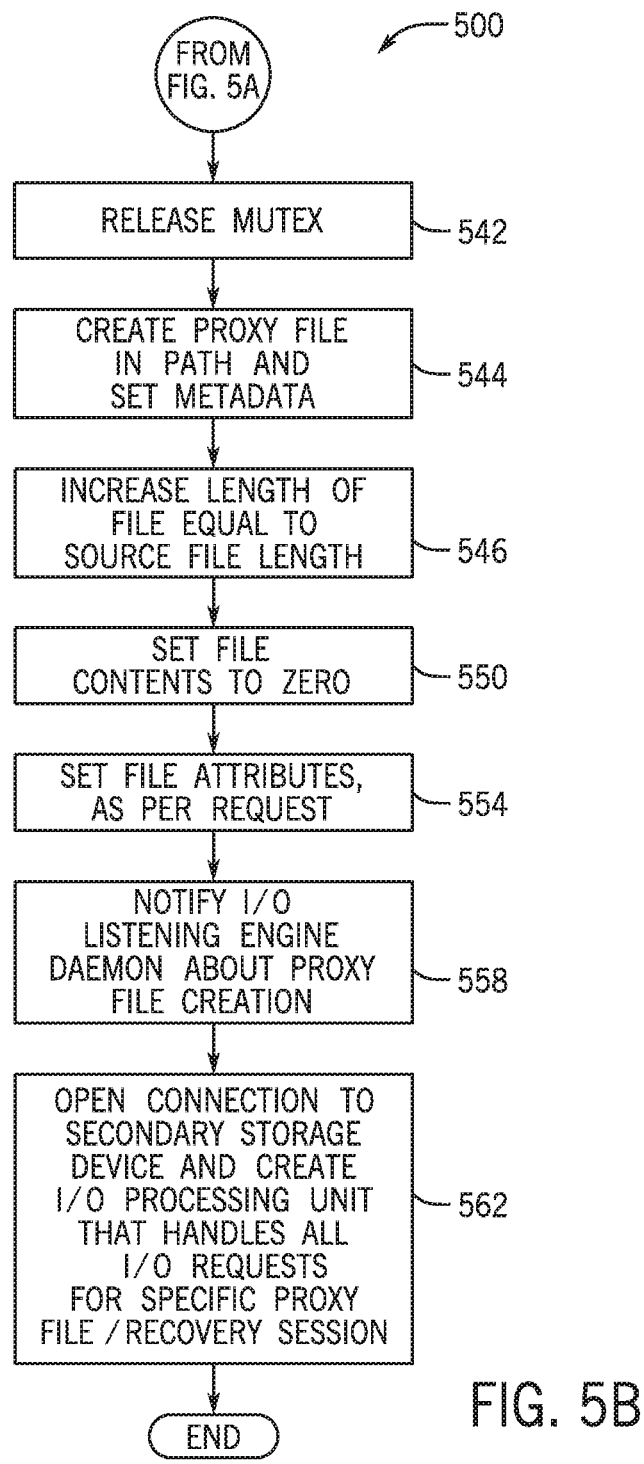

Referring to FIG. 5B in conjunction with FIG. 2, the proxy file mapping engine 156 may then release (block 542) the mutex and create (block 544) the proxy file in the full path, including setting the metadata. Moreover, in accordance with some implementations, the proxy file mapping engine 156 creates the (block 546) proxy file to be a thin file readable by the hypervisor by increasing (block 546) the length of the file to equal the source file length and setting (block 550) the file contents to zero. The proxy file mapping engine 156 may also set (block 554) the file attributes as per the request and notify the I/O listening engine about the proxy file creation, pursuant to block 558. Lastly, in accordance with example implementations the proxy file mapping engine 156 opens (block 562) a connection to the appropriate storage device of the secondary storage 180 and creates or enable an I/O logical processing unit to handle the I/O requests for the specific proxy file/recovery session.

Figure 6:
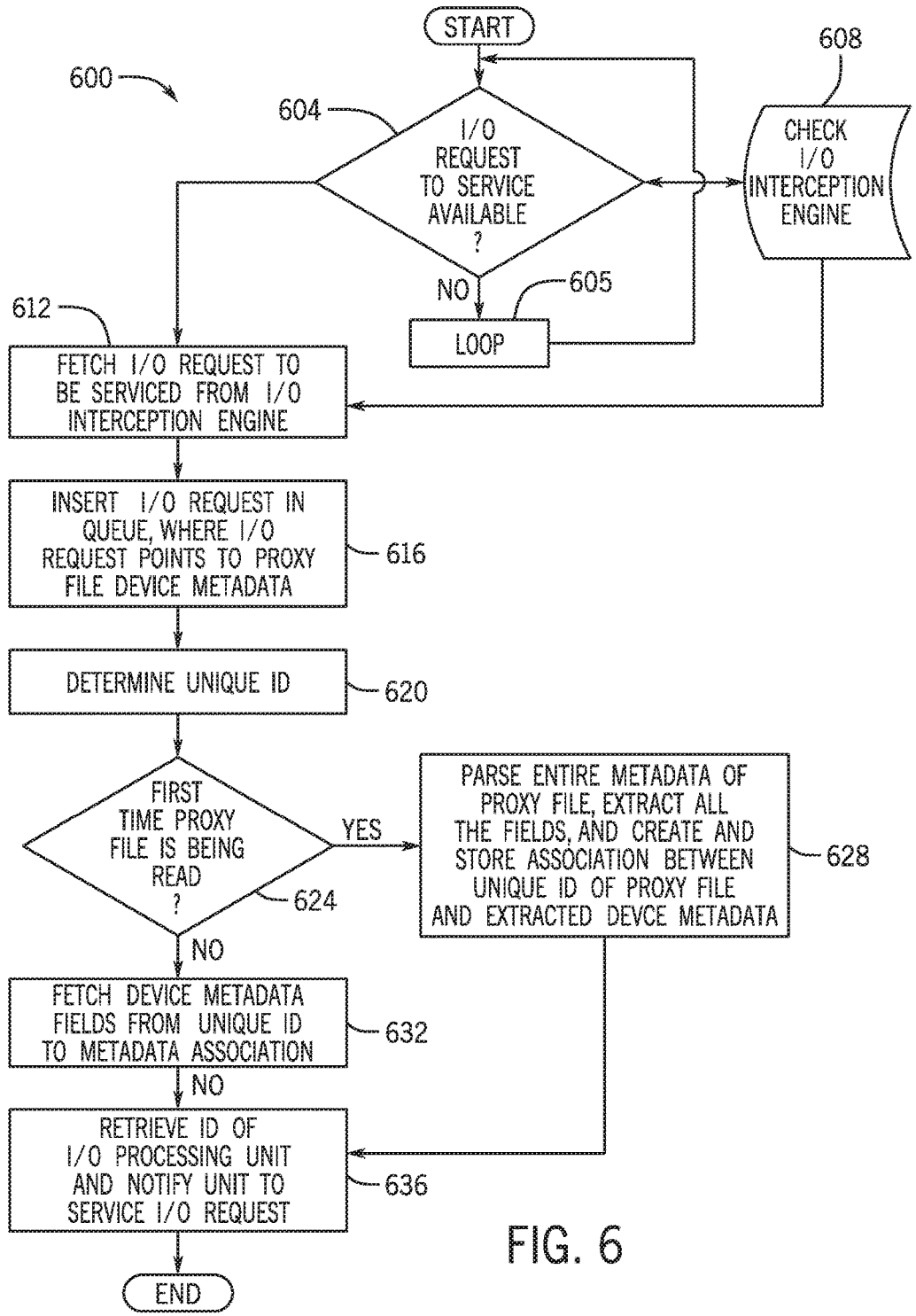
FIG. 6 is a flow diagram depicting a technique to selectively parse proxy files to extract device metadata and use previously extracted device metadata according to an example implementation.

Referring to FIG. 6 in conjunction with FIG. 2, in accordance with example implementations, the proxy file mapping engine 156 may locate the device metadata, as illustrated in a technique 600 of FIG. 6. Referring to FIG. 6 in conjunction with FIG. 2, pursuant to the technique 600, the proxy file mapping engine 156 determines (decision block 604) whether there are any I/O requests to be serviced as indicated by the I/O interception engine 206. In this manner, in accordance with some implementations, the proxy file mapping engine 156 may contact the I/O interception engine 206 (as represented by block 608) to retrieve a set of one or multiple pending I/O requests that have been intercepted by the I/O interception engine 206 and may perform a loop (as depicted by block 605) for this purpose.

Assuming that an I/O request is fetched, pursuant to block 612, the proxy file mapping engine 156 may insert (block 616) the I/O request into a queue. In general, the I/O request points to the proxy file metadata. In this manner, in accordance with example implementations, the unique identifier associated with the proxy file is determined (block 620) and a determination is made (decision block 624) whether this is the first time that the proxy file has been read. If so, the proxy file mapping engine 156 parses (block 628) the entire metadata of the proxy file and extracts metadata from all of the fields. This extraction produces the device metadata, and the proxy file mapping engine 156 creates an association between the identifier for the proxy file and the extracted device metadata so that the device metadata may be used later. In accordance with example implementations, the proxy file mapping engine 156 stores the extracted metadata outside of the proxy file and stores the association of the extracted metadata to the identifier (stores data representing the association in a table, for example).

If the proxy file is not being read for the first time (as determined in decision block 624), then, in accordance with example implementations, the proxy file mapping engine 156 retrieves, or fetches (block 632) the device metadata for the proxy file based on the associated identifier, and pursuant to block 636, the proxy file mapping engine 156 retrieves an identification (ID) of the I/O logical processing unit that is handling I/O request for the associated recovery request. In this manner, in accordance with example implementations, the host 150 maintains associations between the storage connection paths and the IDs for the I/O logical processing units that are used to process I/O requests for associated recovery requests. Moreover, pursuant to block 636, the I/O logical processing unit that is processing or servicing the I/O request is notified about the pending I/O request.

Figure 7:
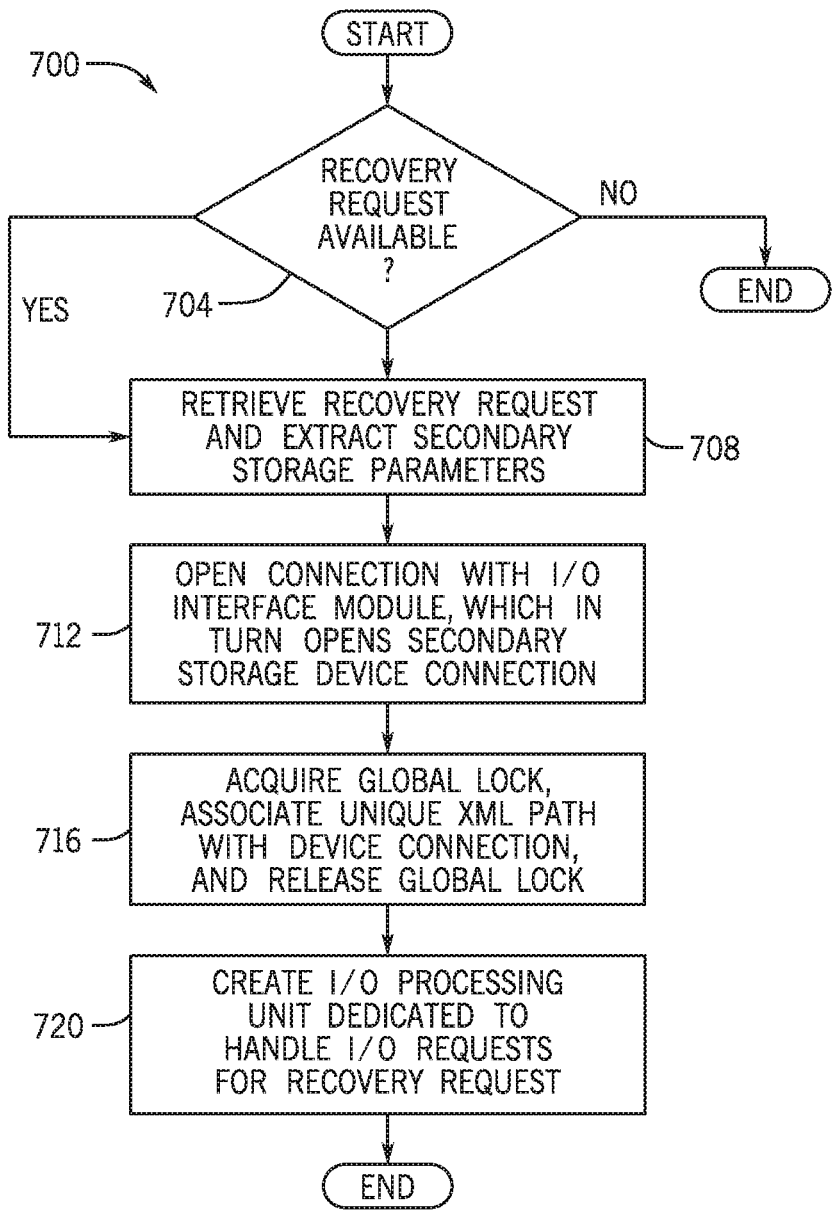
FIG. 7 is a flow diagram depicting a technique to create a logical processing unit to process input/output (I/O) requests associated with a recovery request according to an example implementation.

Referring to FIG. 7 in conjunction with FIG. 2, in accordance with example implementations, a technique 700 may by the I/O listening engine 232 for purposes of listening for recovery sessions and creating corresponding I/O logical processing units to process the I/O requests for the recovery sessions. More specifically, referring to FIG. 7 in conjunction with FIG. 2, in accordance with example implementations, a technique 700 includes the I/O listening engine determining (decision block 704) whether a recovery request is available and if so, retrieving the recovery request and extracting the path to the data from the associated device metadata, pursuant to block 708. A connection may then be opened with the device interface engine 238, which in turn, opens a storage device connection, pursuant to block 712. In accordance with example implementations, blocks 704, 708 and 712 may be performed in a loop for purposes of listening for recovery requests and processing the requests. It is noted that, in accordance with example implementations, a separate connection is created for each recovery request, thereby enabling the running of parallel recovery processes. Pursuant to block 716, the technique 700 includes acquiring a global lock, associating the unique storage path with the device connection and then releasing the global lock. Moreover, in accordance with example implementations, the I/O listening engine creates (block 720) or erases an I/O logical processing unit to handle the I/O requests for this recovery request.

Figure 8A:
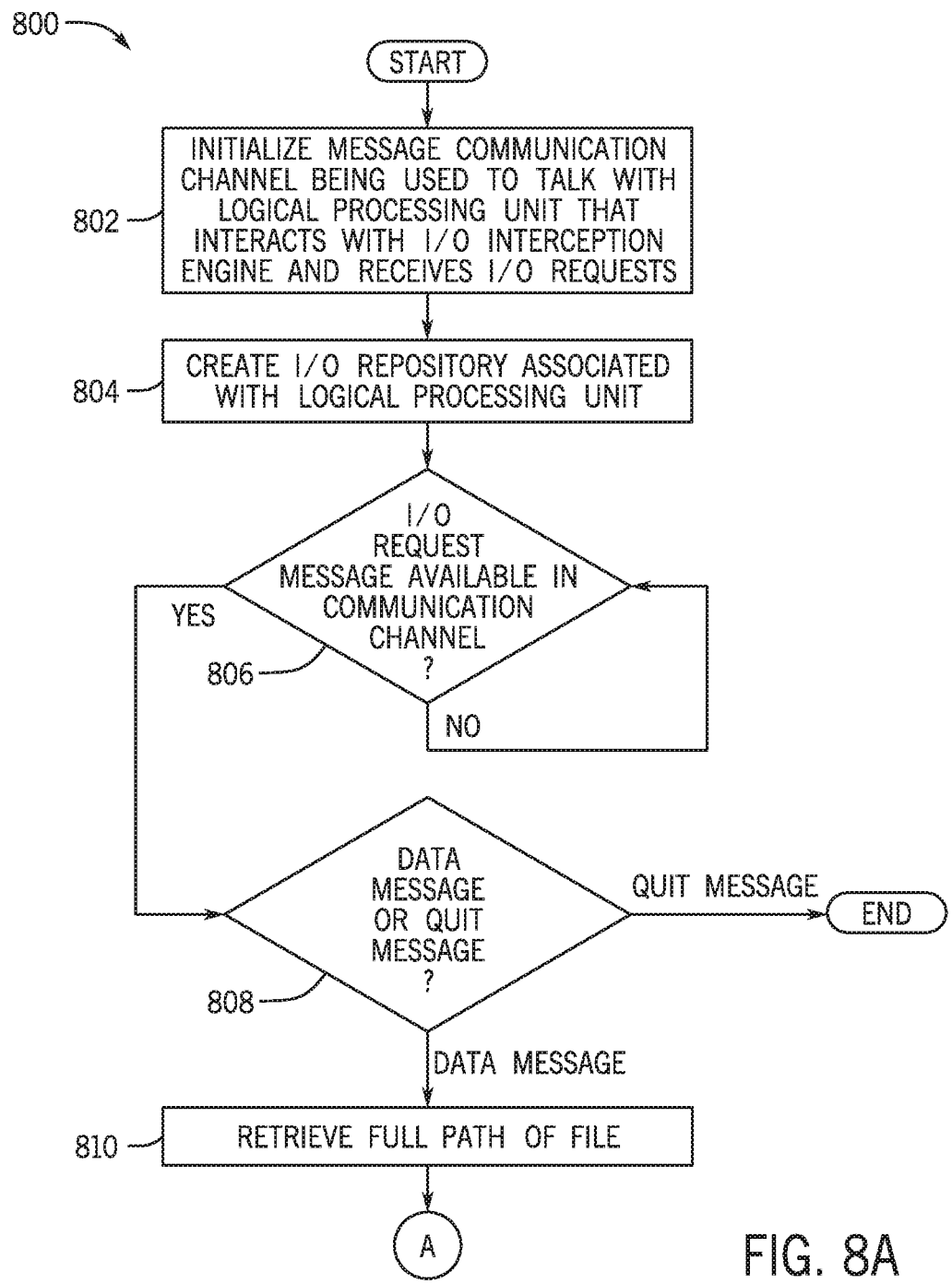

In accordance with example implementations, I/O logical processing unit may perform a technique 800 that is depicted in FIG. 8A. Referring to FIG. 8A in conjunction with FIG. 2, the technique 800 includes initializing (block 802) a message communication channel used to create (block 804) an I/O data repository 164 that is associated with the I/O logical processing unit. The technique 800 includes determining (decision block 806) whether an I/O request message is available in this communication channel, and if not, a loop may be performed until such a message becomes available. After an I/O request message is received, a determination may then be made (decision block 808) whether the message is a data message or a Quit message, and if it is a Quit message, then the technique 800 terminates.

It is noted that it is possible for the same virtual machine file 123 to be accessed at the same time in connection with multiple concurrent different recovery operations, and hence, the full path may be used (block 810) to avoid name duplications.

Figure 8B:
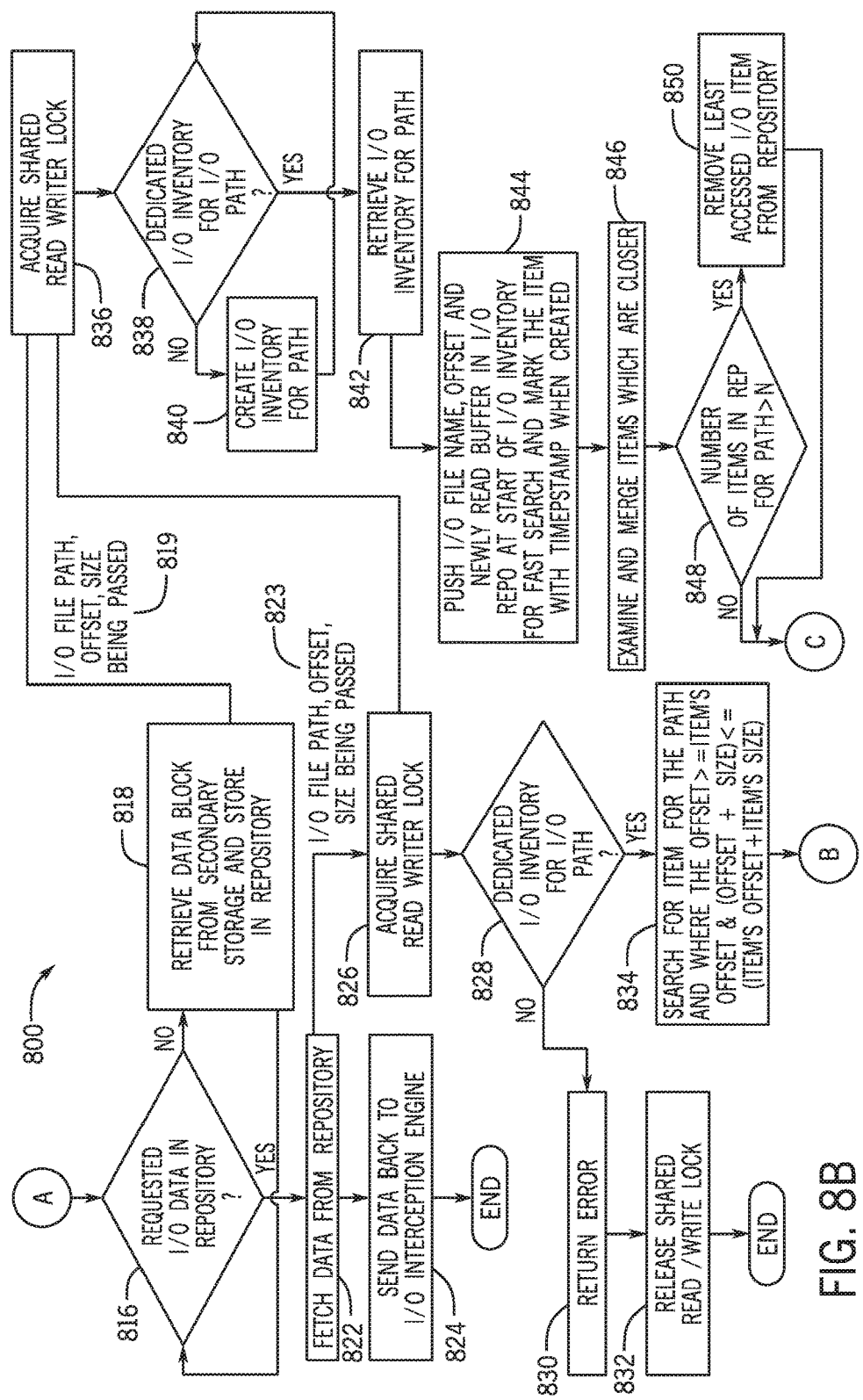

Referring to FIG. 8B in conjunction with FIG. 2, pursuant to the technique 800, a determination is made (decision block 816) whether the requested I/O data is available in the data repository 164. If not, the data is fetched, or retrieved, and stored (block 818) in the data repository 164 that is associated with the I/O logical processing unit. More specifically, in accordance with example implementations, for purposes of retrieving the block, an I/O file path, offset and size are communicated to the secondary storage (as indicated at reference numeral 819) and a shared read writer lock is acquired, pursuant to block 836. A determination is made (decision block 838) whether a dedicated I/O inventory exists for this I/O path, i.e., a determination of whether a buffer in the associated data repository 164 exists. If not, the I/O inventory is created, pursuant to block 840 and next, the I/O inventory is retrieved for this path, pursuant to block 842.

More specifically, in accordance with example implementations, the technique 800 includes pushing the I/O file name, the offset and the newly read buffer in the data repository 164 at the start of the I/O inventory for the fast search and marking the item with the timestamp when it was created, pursuant to block 844. It is noted that the timestamp may be used for cleanup operations. The technique 800 next includes examining and merging items in the data repository 164, which are closer than other merged, consolidated blocks, pursuant to block 846.

In accordance with example implementations, a determination may then be made (decision block 848) whether the number of items in the data repository 164 is greater than a predetermined number N; and if so, the last accessed I/O item may then be removed from the data repository 164, pursuant to block 850. Referring to FIG. 8C, the technique 800 then includes releasing (block 870) the shared read/write lock.

Referring back to FIG. 8B, If, a determination is made (decision block 816) that the requested I/O data is available from the data repository 164, then the data is retrieved, or fetched (block 822), from the data repository 164. In this manner, in accordance with example implementations, the fetching of the data from the data repository 164 may include acquiring (block 826) a shared read/writer lock and determining (decision block 828) whether a dedicated I/O inventory exists for the path. If not, an error is returned and the shared read/write locks are released, pursuant to blocks 830 and 832.

If a dedicated I/O inventory exists for the I/O path, then the technique 800 includes searching (block 834) for an item for the path and where the offset is greater than or equal to the item's offset and the offset and the size is less than or equal to the item's offset plus the item size. Referring to FIG. 8C, the technique 800 includes marking (block 852) the item's access timestamp with the latest timestamp to indicate that the item is still "fresh" and stop searching and mark the item's content. Next, pursuant to decision block 854, a determination is made whether it is time for looking at the I/O inventory and removing items which have not been used for a relatively long time. For example, decision block 864 may be performed in Z minutes, where Z is a configurable number, in accordance with example implementations. If so, then, pursuant to decision block 864, for all paths in the data repository 164, a determination is made of the I/O inventory for the particular categories of virtual machine files, such as .vmx, .vmd and —flat.vmdk files, for example.

More specifically, in accordance with example implementations, the technique 800 includes, for each I/O item in this path, determining (block 864) whether the I/O item has not been accessed for P minutes and if not, the item may be removed, pursuant to block 866. A determination is made (decision block 867) that another I/O item is to process control returns to decision block 864. Otherwise, a return occurs, pursuant to block 868, and the item's content is returned, pursuant to block 856 so that the item gets returned back to the recovery operation and then the shared read/write lock is released, pursuant to block 858.

Figure 9:
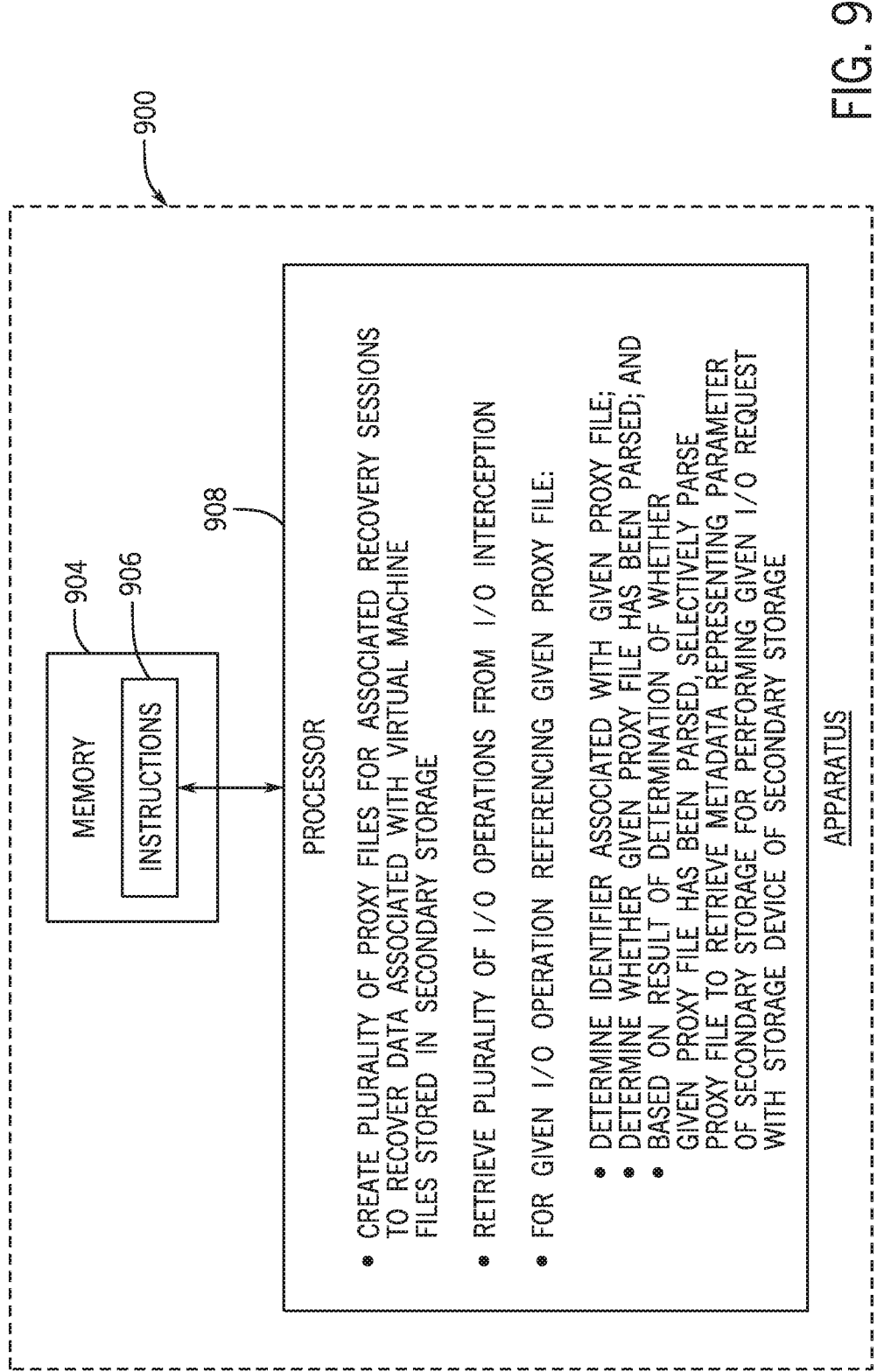
FIG. 9 is a schematic diagram of an apparatus according to an example implementation.

Thus referring to FIG. 9, in accordance with example implementations, an apparatus 900 includes a processor 908 and a memory 904. The memory 904 stores instructions 906 that when executed by the processor 908 causes the processor 908 to create a plurality of proxy files for associated recovery sessions to recover data associated with virtual machine files that are stored in a secondary storage; retrieve a plurality of I/O requests from an I/O interception. For a given I/O request of the plurality of operations referencing a given proxy file, the instructions 906, when executed by the processor 908, may cause the processor 908 to determine an identifier associated with the given proxy file; determine whether the given proxy file has been parsed; and based on a result of the determination of whether the given proxy file has been parsed, selectively parse the proxy file to retrieve metadata representing a parameter of the secondary storage for performing the given I/O request with a storage device of the secondary storage.

In this context, "selectively" parsing the proxy file means that the proxy file is parsed or not, depending on (among one of potentially many factors) whether the proxy file has been previously parsed. For example, in accordance with example implementations, selectively parsing the proxy file may refer to 1.) parsing the proxy file if it is determined that the proxy file has not been parsed; and 2.) not parsing the proxy file (and retrieved the previously extracted device metadata, for example) if it is determined that the proxy file has been parsed.

Referring back to FIG. 2, in accordance with example implementations, one or multiple processor(s) 154 of the host 150 may execute machine executable instructions (or "software") stored in the memory 152 such that the execution causes the processor(s) 154 to form components that are described herein, such as the logical processing units, the I/O logical processing units, the I/O inventory engine 160, the device interface engine 238 and the proxy file mapping engine 156. Moreover, in accordance with example implementations, one or multiple other components of the host 150 may be formed by the processor(s) 154 executing machine executable instructions that are stored in the memory 152, such as, for example, the I/O listening engine 232, the I/O interceptions engine 206 and so forth. Thus, any of the engines described herein may take the form of a non-transitory computer-readable medium storing instructions executable by a processor to implement the various engine features described above.

In accordance with further example implementations, all or part of the above-described processor-based architecture may be replaced by dedicated, hardware circuitry. For example, in accordance with example implementations, one or more of the engines that are described herein may be formed by dedicated, hardware circuitry. As a more specific example, in accordance with some implementations, one or more of the components of the host 150 (such as one or multiple engines, as well as other components) may be formed from one or multiple ASICs or one or multiple FPGAs. Thus, many implementations are contemplated, which are within the scope of the appended claims.

While the present disclosure describes a limited number of embodiments, those skilled in the art, having the benefit of this disclosure, will appreciate numerous modifications and variations therefrom. It is intended that the appended claims cover all such modifications and variations.

What is claimed:

1. A method comprising:
in response to a recovery request to recover data associated with a virtual machine file, creating a proxy file, wherein the virtual machine file is associated with a virtual machine, and the proxy file has a file format recognized by a hypervisor for the virtual machine;
extracting metadata from the proxy file representing a parameter associated with a secondary storage;
storing the extracted metadata outside of the proxy file;
associating the extracted metadata with an identifier; and
in response to an input/output (I/O) request associated with the recovery request, retrieving the extracted metadata to determine the parameter based on the identifier of the proxy file and processing the I/O request based on the determined parameter.

2. The method of claim 1, wherein the parameter represents at least one of a location of the data in a storage device of the secondary storage or a credential of a host processing the I/O request.

3. The method of claim 1, wherein extracting the metadata from the proxy file comprises extracting the metadata in response to processing another I/O request associated with the recovery request.

4. The method of claim 1, further comprising:
creating a logical processing unit to process the I/O request associated with the recovery request;
associating the logical processing unit with a data repository; and
using the logical processing unit to retrieve data from the data repository in response to the I/O request in lieu of retrieving the data from the secondary storage.

5. The method of claim 4, further comprising:
sizing the data repository based on a characteristic of the recovery request.

6. The method of claim 1, wherein the I/O request targets first data stored in the secondary storage, the method further comprising:
creating a logical processing unit to process the I/O request associated with the recovery request;
associating the logical processing unit with a data repository;
using the logical processing unit to perform a block transfer operation to retrieve first data and second data from the secondary storage;
storing the second data in the data repository;
using the logical processing unit to provide the first data in response to the I/O request; and
using the logical processing unit to retrieve at least part of the second data from the data repository and provide the at least part of the second data in response to another I/O request.

7. The method of claim 1, further comprising:
creating a logical processing unit to process the I/O request associated with the recovery request, wherein the I/O request is one of a plurality of I/O requests processed by the logical processing unit and associated with the recovery request;
associating the logical processing unit with a data repository;
the logical processing unit processing the I/O requests, comprising retrieving data from the secondary storage and storing the retrieved data in the data repository; and
the logical processing unit maintaining a data inventory for the data repository.

8. The method of claim 7, further comprising:
the logical processing unit selectively invalidating data in the data inventory based on associated access to the data.

9. The method of claim 1, wherein creating the proxy file comprises creating a thin file.

10. An article comprising a non-transitory storage medium storing instructions, that when executed by a computer, cause the computer to:
create a proxy file associated with a recovery request, wherein the recovery request is associated with the recovery of data associated with a virtual machine file from a secondary storage; and
use metadata extracted from the proxy file to access the data, including, in response to an input/output (I/O) request associated with the recovery request:
storing an association of an identifier of the proxy file with metadata representing a parameter associated with the secondary storage, wherein the metadata is stored outside the proxy file;
using the metadata to identify an I/O logical processing unit; and
communicating with the I/O logical processing unit to notify the I/O logical processing unit to process the I/O request.

11. The article of claim 10, the storage medium storing instructions that, when executed by the computer, cause the computer to:
in response to the recovery request, open a connection with the secondary storage and assign a logical processing unit to the connection;

use the extracted metadata to retrieve an identification of the I/O logical processing unit; and communicate with the I/O logical processing unit to notify the I/O logical processing unit to process the I/O request.

12. The article of claim 11, the storage medium storing instructions, that when executed by the computer, cause the computer to:

in response to another recovery request, create another proxy file associated with the another recovery request.

13. The article of claim 12, wherein the recovery request comprises a first recovery request, the storage medium storing instructions that, when executed by the computer, cause the computer to:

create a first I/O logical processing unit to process the I/O request associated with the first recovery request; and create a second I/O logical processing unit to process another I/O request associated with a second recovery request to recover data associated with the virtual machine file.

14. The article of claim 10, wherein the parameter represents a location of the data in a storage device of the secondary storage.

15. The article of claim 10, wherein a host performs the processing of the I/O request, and the parameter represents a credential of the host.

16. An apparatus comprising:

a processor; and a memory storing instructions that, when executed by the processor, cause the processor to:

create a plurality of proxy files for associated recovery sessions to recover data associated with virtual machine files stored in a secondary storage;

retrieve a plurality of I/O requests; and for a given I/O request of the plurality of I/O requests referencing a given proxy file:

determine an identifier associated with the given proxy file;

determine whether the given proxy file has been parsed; and based on a result of the determination of whether the given proxy file has been parsed, selectively parse the proxy file to retrieve metadata representing a parameter of the secondary storage for performing the given I/O request with a storage device of the secondary storage.

17. The apparatus of claim 16, wherein the instructions, when executed by the processor, cause the processor to determine the identifier associated with the proxy file based on an operation time of the processor.

18. The apparatus of claim 16, wherein the instructions, when executed by the processor, cause the processor to provide a lock to prevent other identifiers from being generated during a time interval in which the identifier of the proxy file is being generated.

19. The apparatus of claim 16, wherein the proxy file comprises the metadata representing a connection to the secondary storage and at least one of metadata identifying a version of the proxy file, metadata identifying permission to delete the proxy file and metadata representing permission to write to the proxy file.

20. The apparatus of claim 16, wherein the instructions, when executed by the processor, cause the processor to create a logical processing unit to process I/O requests associated with the given proxy file and associate the identifier with the logical processing unit.

* * * * *